United States Patent [19]
Araujo et al.

[11] 4,210,386
[45] Jul. 1, 1980

[54] FLUORINE OUT-DIFFUSED OPTICAL DEVICE AND METHOD

[75] Inventors: Roger J. Araujo, Corning; Nicholas F. Borrelli, Elmira; John D. Crow, Mohegan Lake; Thomas P. Seward, III, Corning, all of N.Y.

[73] Assignee: Corning Glass Works, Corning, N.Y.

[21] Appl. No.: 691,591

[22] Filed: Jun. 1, 1976

Related U.S. Application Data

[62] Division of Ser. No. 570,713, Apr. 23, 1975, Pat. No. 3,981,707.

[51] Int. Cl.² ................................................ G02B 5/14
[52] U.S. Cl. ........................... 350/96.31; 65/30 R; 350/96.34
[58] Field of Search ........ 350/96 WG, 96 GN, 96.31, 350/96.34; 65/30 R

[56] References Cited

U.S. PATENT DOCUMENTS

| | | | |
|---|---|---|---|
| 3,784,386 | 1/1974 | Arayo et al. | 65/30 R |
| 3,843,228 | 10/1974 | Yoshiyagawa et al. | 350/96 WG |
| 4,161,505 | 7/1979 | Shiraishi et al. | 264/171 |

Primary Examiner—Stewart J. Levy
Attorney, Agent, or Firm—William J. Simmons, Jr.; Walter S. Zebrowski; Clarence R. Patty, Jr.

[57] ABSTRACT

A fluorine containing silicate glass substrate is heated to a temperature sufficiently high to permit fluorine to out-diffuse from the surface thereof. A surface region is formed having a gradient fluorine concentration in a direction perpendicular to the substrate surface, the region of lowest fluorine concentration having the highest refractive index. The resultant device is capable of functioning as an optical waveguide.

1 Claim, 8 Drawing Figures

FLUORINE OUT-DIFFUSED OPTICAL DEVICE AND METHOD

This is a division, of application Ser. No. 570,713, filed Apr. 23, 1975 now U.S. Pat. No. 3,981,707.

BACKGROUND OF THE INVENTION

The present invention relates to graded index optical devices and to a method of making the same. More particularly, this invention relates to a method of fabricating optical devices such as waveguides by heat treating a fluorine containing glass body to produce a change in the refractive index of a surface region of the body due to fluorine out-diffusion. As used herein, the term "optical waveguide" refers to a material containing a system of refractive index gradients capable of guiding waves of optical energy. This term, therefore, includes both optical fibers which are usually employed as the transmission medium for optical communication systems and to planar devices which are usually employed in optical circuits that are required for processing optical signals. The light propagating channel can be a cylindrical core in the case of an optical waveguide fiber, or it can be a planar layer on the surface of a substrate or sandwiched between two adjacent layers of lower refractive index. The term "optical energy" and "optical," as used herein, include the infrared, visible and ultraviolet portions of the electromagnetic spectrum.

Some operational theories and other pertinent information concerning optical waveguide fibers can be found in U.S. Pat. No. 3,157,726 issued to Hicks et al. and in the publication "Cylindrical Dielectric Waveguide Mode" by E. Snitzer, Journal of the Optical Society of America, Vol. 51, No. 5, pages 481–498, May 1961. Information concerning planar optical waveguides may be found in the publications: "Evanescent Field Coupling into a Thin-Film Waveguide" by J. E. Midwinter, IEEE Journal of Quantum Electronics, Vol. QE-6, No. 10, Oct. 1970, pages 583–590; "Light Waves in Thin Films and Integrated Optics" by P. K. Tien, Applied Optics, Vol. 10, No. 11, Nov. 1971, pages 2395–2413; and "Dielectic Rectangular Waveguide and Directional Coupler for Integrated Optics" by E. A. J. Marcatili, The Bell System Technical Journal, Vol. 48, No. 7, Sept. 1969, pages 2071–2102.

Although single mode waveguides are advantageous in that they are capable of propagating optical signals with very low dispersion, due to the low numerical aperture and/or small core size of such fibers, lasers must be employed to inject optical signals into these waveguides. Multimode waveguides generally have larger core diameters and larger numerical apertures than single mode waveguides and are therefore often the preferred medium for the transmission of optical signals, since they can accept light from incoherent, broad spectral width sources such as light emitting diodes. However, in a multimode waveguide, the various modes propagate at slightly different group velocities. Thus, a short input pulse that is shared by a plurality of guided modes splits up into a sequence of pulses that arrive at the output end of the waveguide at different times. This type of pulse dispersion is the dominant cause of dispersion in multimode waveguides.

A well-known mode equalization technique which results in decreased dispersion requires an index gradient across the light propagating core or channel. For example, assuming a cylindrical waveguide, the refractive index is greatest along the axis thereof and decreases as a certain power $\alpha$ of the radius. A discussion of graded index waveguides appears in the publication "Optical Fibers for Communication" by D. Gloge, Applied Optics, Vol. 13, No. 2, Feb. 1974, pp. 249–254 and "Multimode Theory of Graded-Core Fibers" by D. Gloge and E. A. J. Marcatili, Bell System Technical Journal, Vol. 52, No. 9, Nov. 1973, pp. 1563–1578. As a result of this variation in refractive index across the optical waveguide core or channel, light rays deviating from the axial direction propagate into regions of lower index where their higher speed compensates for the greater distance of propagation. Thus, as graphically illustrated on page 252 of said Gloge publication, the impulse response of graded index optical waveguides is substantially improved.

Gradient index optical waveguides are also advantageous in that they have less light scattering loss because boundary imperfections are smoothed out. In planar waveguides surface imperfections at the boundary between the light transmitting layer and air, for example, still contribute to scattering, but the modal optical power is concentrated away from the surface of the planar structure. Therefore, loss due to scattering at that surface is reduced.

SUMMARY OF THE INVENTION

Briefly, the present invention relates to a method of forming an optical device having a layer, the refractive index of which is higher than that of the remainder of the device. A transparent silicate glass body is provided, the body containing an amount of fluorine effective to decrease the refractive index thereof to a value below that of the silicate glass alone. The glass body is heated to a temperature below the softening point temperature of the silicate glass but sufficiently high to effect an out-diffusion of fluorine from at least one surface of the glass body to form at that surface a layer of reduced fluorine content. The concentration of fluorine in the surface layer increases from a minimum value at the surface to a maximum value within the body so that the refractive index of the surface layer decreases from a maximum value at the surface to a minimum value within the body.

The surface layer is of adequate thickness and has a refractive index sufficiently greater than that of the remainder of the glass body to enable the layer to propagate optical wave energy. If the surface layer is formed on the inner surface of a glass tube, the tube can be drawn into an optical waveguide fiber.

composition H, which was added to the batch as silver nitrate, is expressed in percent by weight in excess of the total glass composition in which the sum of the constituents listed other than silver totals 100%.

TABLE I

|  | A | B | C | D | E | F | G | H | I | J |
|---|---|---|---|---|---|---|---|---|---|---|
| $SiO_2$ | 51.9 | 56.3 | 54.8 | 64.1 | 64.5 | 60.6 | 60.0 | 63.7 | 54.8 | 63.5 |
| $Al_2O_3$ | 9.6 | 9.0 | 10.6 | 8.0 | — | 9.6 | 10.0 | 12.1 | 19.1 | 12.1 |
| $B_2O_3$ | 23.5 | 16.3 | 16.2 | 17.1 | 21.0 | 19.8 | 20.0 | 16.0 | 17.0 | 16.0 |
| BaO | — | 6.7 | 8.4 | — | — | — | — | — | — | — |
| PbO | 1.0 | 5.1 | 5.4 | 5.1 | 1.7 | 1.6 | — | — | — | — |
| $Li_2O$ | 2.5 | 2.6 | 2.7 | 1.0 | — | 3.5 | — | 2.0 | 1.5 | 2.0 |
| $Na_2O$ | 9.2 | 1.8 | 1.9 | 3.5 | 11.5 | 3.6 | 10.0 | 6.2 | 7.5 | 6.2 |
| $K_2O$ | 0.4 | — | — | 1.2 | 1.3 | 1.3 | — | — | — | — |
| $Sb_2O_3$ | — | — | — | — | — | — | — | — | 0.2 | 0.2 |
| CdO | 1.9 | — | — | — | — | — | — | — | — | — |
| CuO | * | — | — | — | — | — | — | — | — | — |
| $ZrO_2$ | — | 2.2 | — | — | — | — | — | — | — | — |
| Ag | — | — | — | — | — | — | — | 2.5 | — | — |

*indicates a trace amount

DETAILED DESCRIPTION

It is to be noted that the drawings are illustrative and symbolic of the invention and there is no intention to indicate scale or relative proportion of the elements shown therein.

Figure 1:
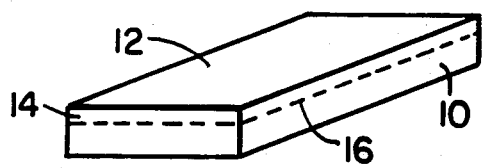
FIG. 1 illustrates a planar optical waveguide constructed in accordance with the method of the present invention.

In accordance with the present invention, an optical device having a surface layer of high refractive index relative to that of the remainder of the device is formed by a fluorine out-diffusion process. Referring to FIG. 1, a fluorine containing silicate glass substrate 10 is subjected to a sufficiently high temperature to cause fluorine to out-diffuse from surface 12, thereby forming in that region of the substrate adjacent to surface 12 a fluorine depleted layer 14 having a refractive index greater than that of the remainder of the substrate. A fluorine containing substrate having this type of surface layer is capable of functioning as a planar optical waveguide.

Substrate 10 can be formed from any fluorine containing silicate glass composition that lies in a stable glass forming region, i.e., it can be formed from a glass which does not devitrify or opalize when the fluorine is added or during the fluorine out-diffusion heat treatment. If the fluorine causes the glass to devitrify or if it causes the precipitation of fluorides, light scattering can occur in the glass, thereby rendering it unsuitable for optical applications. Thus, fluorine may be present in amounts effective for forming a high refractive index surface layer, but it must be present in amounts sufficiently low that devitrification or precipitation of fluoride crystals does not occur. All silicate glasses investigated showed an inverse relationship between fluorine concentration and refractive index; however, this relationship between refractive index and fluorine concentration was not observed in borate and phosphate systems. Relatively low levels of fluorine present in the base silicate glass were sufficient to permit the formation of optical waveguides by a fluorine out-diffusion process. Alkali alumino borosilicate glasses have been found to be very satisfactory for purposes of the present invention, these glasses being easily melted and exhibiting relatively low thermal expansion. Some base glasses to which fluorine may be added to form substrates suitable for use in the present invention are set forth in Table I wherein compositions are expressed in weight percent on the oxide basis as calculated from the batch. In accordance with conventional practice the silver in To form a planar optical waveguide, a flat sheet or plate of fluorine-containing glass is formed by any one of the various well known techniques, and one surface thereof is ground and polished to form a flat, optical quality suface, the opposed surface also being ground flat. The resultant substrate is heat treated in a dust-free environment to cause fluorine to out-diffuse from the optical quality surface. During heat treatment the substrate is preferably supported on an optically flat refractory oxide or refractory metal support. To cause fluorine out-diffusion to occur, the substrate is generally heat treated at a temperature between the annealing point and the softening point. The annealing point generally corresponds to a viscosity of $10^{13}$ poise and the softening point to a viscosity of about $10^{7.6}$ poise. The softening and annealing point temperatures generally depend upon glass composition. For example, the softening points of compositions A, B, D and F of Table I are 638° C., 676° C., 666° C. and 660° C., respectively, and the annealing points thereof are 481° C., 506° C., 460° C. and 489° C., respectively. Temperatures above the softening point can be employed, but the glass tends to deform under its own weight, and preservation of an optically flat surface becomes difficult. Some fluorine out-diffusion takes place at temperatures lower than the annealing point, and it is expected that some out-diffusion will take place at temperatures as low as the strain point, wherein the viscosity is equal to about $3 \times 10^{14}$ poise. However, for out-diffusion to take place within reasonable periods of time, temperatures above the annealing point should be used. For purposes of comparison, it is noted that the strain point temperatures of compositions A, B, D and F of Table I are 447° C., 476° C., 420° C. and 456° C., respectively.

Figure 2:
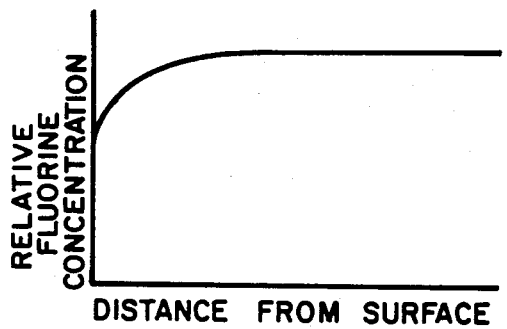
FIG. 2 is a graph illustrating fluorine concentration as a function of distance from the surface of the waveguide of FIG. 1.
Figure 3:
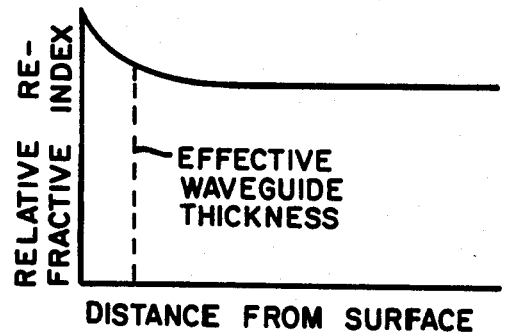
FIG. 3 is a graph illustrating the variation in refractive index with respect to distance from the surface of the waveguide of FIG. 1.

FIG. 2 illustrates the relative concentration of fluorine as a function of distance from surface 12 as a result of fluorine out-diffusion due to heating. FIG. 3 illustates the manner in which the refractive index varies with respect to distance into the substrate from surface 12 as a result of the fluorine concentration gradient illustrated in FIG. 2. The effective waveguide thickness, which is illustrated in FIG. 3 by the dashed line, is illustrated by dashed line 16 in FIG. 1. Since the refractive index decreases gradually from a high value at the surface to a relatively lower value at some distance from the surface, multimode waveguides which exhibit relatively low dispersion due to velocity differences among the modes can be produced by this method.

The following example illustrates the manner in which planar optical waveguides can be formed in accordance with the method of the present invention. To a glass melt having composition A of Table I was added 0.47 wt. % fluorine. Fluorine content is expressed as percent by weight in excess of the total weight of the other composition constituents. The melt was cast into a pluraltiy of flat substrates, the surfaces of which were thereafter ground and polished. The effects of the duration of the heat treatment as well as the temperature thereof are illustrated in Table II.

TABLE II

| Composition | Heat Treatment Temp. | Time | No. of Modes |
|---|---|---|---|
| Base glass A to which 0.47 wt. % fluorine was added | 500° C. | 88 hrs. | none |
| | 500° C. | 136 hrs. | 1 |
| | 550° C. | 1 hr. | none |
| | 550° C. | 16 hrs. | 1 |
| | 550° C. | 64 hrs. | 2 |
| | 600° C. | ½ hr. | 1 |
| | 650° C. | 10 min. | 1 |

After a substrate was heat treated, a beam of laser light having a wavelength of 6328 Å was coupled into the fluorine depleted surface layer by means of a glass prism in the manner taught in U.S. Pat. Nos. 3,586,872 and 3,822,928. Table II gives the number of modes that could be propagated in the surface layer as a result of different heat treatments. It is known that the number of modes that can be propagated in the surface layer is indicative of the thickness of that layer and the difference in refractive indices of the surface layer and the bulk portion of the substrate. Table II indicates that the fluorine out-diffusion process is both temperature and time dependent. When a relatively low heat treatment temperature, viz. 500° C., was employed, an insufficient amount of fluorine out-diffusion occurred and the resultant device did not function as an optical waveguide even after 88 hours of heat treatment. However, by extending the heat treatment time at 500° C. to 136 hours, a single mode waveguide was formed. By increasing the temperature to which base glass A was heated to 650° C., a single mode waveguide could be formed in 10 minutes.

To illustrate the effect of the initial concentration of fluorine in the base glass as well as the effect of the duration of the fluorine out-diffusion process, base glass compositon A of Table I was used to form five different melts. Each melt contained an amount of fluorine which is set forth in the left column of Table III.

TABLE III

| Fluorine Concentration of each melt | Number of modes propagated as a result of heat treatment at 550° C. for specified number of hours | | | |
|---|---|---|---|---|
| | 16 hrs. | 36 hrs. | 56 hrs. | 124 hrs. |
| 0.1 wt. % | 0 modes | 0 modes | 1 mode | 1 mode |
| 0.2 wt. % | 0 modes | 0 modes | 1 mode | 1 mode |
| 0.4 wt. % | 1 mode | 1 mode | 2 modes | 2 modes |
| 0.8 wt. % | 1 mode | 2 modes | 2 modes | 3 modes |
| 1.2 wt. % | 1 mode | 2 modes | 2 modes | 3 modes |

Each melt was used to form four substrates of the type illustrated in FIG. 1. The substrates were subjected to heat treatment at 550° C., for time periods ranging from 16 hours to 124 hours, as indicated in Table III, to form in each substrate a surface layer of lower fluorine concentration than the remainder of the substrate. A beam of laser light having a wavelength of 6328 Å was coupled into the fluorine depleted layer in the manner previously described. Table III indicates that the number of modes which could be propagated in these waveguides increased with increasing fluorine concentration in the base glass as well as with increased duration of the high temperature fluorine out-diffusion heat treatment.

The refractive indices of the fluorine depleted surface layers of the substrates cannot be measured. However it is well known that the refractive index of a light guiding layer must be higher than that of the surrounding media; for example, see the article entitled "Transmission of Optical Energy Along Surfaces: Part II Inhomogeneous Media" by H. Osterberg et al., Journal of the Optical Society of America, vol. 54, pp. 1078–1084. To further illustrate the relationship between fluorine content and refractive index, various amounts of fluorine were added to base glass compositions H, I and J of Table I, and the refractive indices of the resultant glasses are indicated in Table IV.

TABLE IV

| wt.% F | Refractive Index | | |
|---|---|---|---|
| | Base Glass H | Base Glass I | Base Glass J |
| 0 | 1.494 | 1.494 | 1.492 |
| 1.5 | 1.492 | | |
| 2.5 | 1.488 | | |
| 3.0 | | | 1.483 |
| 5.0 | 1.478 | | 1.477 |
| 10.0 | 1.474 | | 1.473 |
| 15.0 | | 1.471 | 1.473 |

Table IV reveals an inverse relationship between fluorine content and refractive index. However, the change in refractive index is more pronounced at lower fluorine concentrations, and the refractive index appears to saturate at the higher levels of added fluorine as shown by composition J which had the same value of refractive index when both 10 and 15 wt. % fluorine was added to the batch. The maximum amount of fluorine that can be incorporated in the glass is not known, and even though 15 wt. % fluorine was added to the batch, the entire amount may not have remained in the glass. If composition J were to be employed, there would be no benefit of adding more than 10 wt. % fluorine to the batch since no further decrease in refractive index could be obtained, at least with the melting conditions employed. Referring again to Table III, it is seen that relatively small amounts of fluorine are sufficient to effect a sufficient change in refractive index to form optical waveguides. Thus the larger flourine concentrations shown in Table IV are not needed for that application. The inverse relationship between fluorine content and refractive index is also disclosed in U.S. Pat. No. 3,784,386 issued to R. J. Araujo et al.

Figure 4:
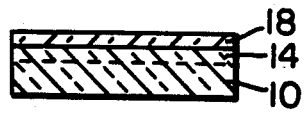
FIG. 4 is a cross-sectional view of a planar optical waveguide.

As shown in FIG. 4 a protective layer 18 of transparent material may be applied to the surface of light guiding layer 14. Layer 18 must have a refractive index lower than that of layer 14 and must be formed at a temperature sufficiently low that the high index layer is not adversely affected. Layer 18 could be a sputtered oxide layer, a plastic layer or the like.

Figure 5:
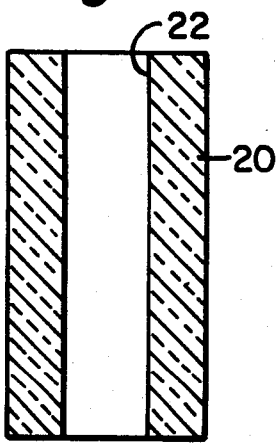
FIG. 5 is a tubular blank which can be employed in the formation of optical waveguide fibers.
Figure 6:
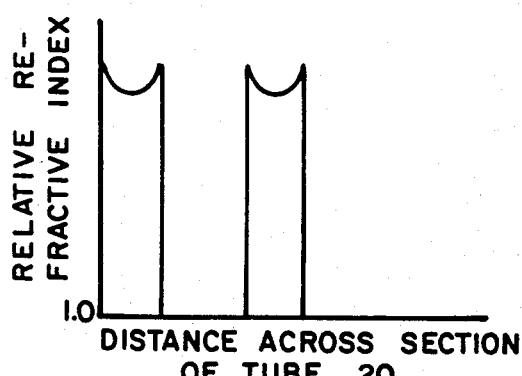
FIG. 6 is a graph illustrating the refractive index as a function of distance across the tube of FIG. 5.

Optical waveguide fibers can also be formed by a fluorine out-diffusion process. A fluorine-containing glass tube 20, which is illustrated in FIG. 5, is subjected to heat treatment to cause out-diffusion of fluorine from the surfaces thereof. The temperature and length of time to which tube 20 is subjected to heat treatment determines the amount of fluorine out-diffusion which occurs. This heat treatment causes the inner and outer surfaces of tube 20 to contain fluorine depleted regions of the type represented in FIG. 2. Thus, the relative refractive index as measured across a section of tube 20 is represented by the graph in FIG. 6. The regions of highest refractive index are the inner and outer surfaces of tube 20 which contain the lowest concentration of fluorine after heat treatment.

Figure 7:
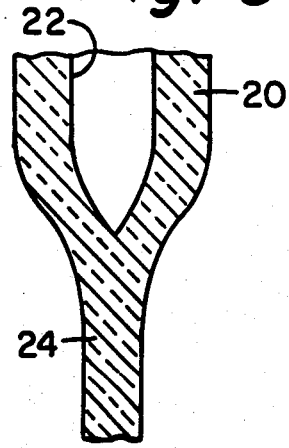
FIG. 7 illustrates the step of drawing a tubular blank into an optical waveguide fiber.

After the high temperature out-diffusion process is completed, tube 20 is heated to the drawing temperature thereof and is drawn as illustrated in FIG. 7. Fibers can be drawn at temperatures such that the viscosity of the glass is in the range of $10^4$ to $10^7$ poise. For composition B of Table I, for example, this temperature range would be between 700° C. and 950° C. As tube 20 is drawn, the cross-sectional area thereof is reduced and inner surface 22 collapses, thereby forming an optical waveguide fiber 24 having a solid cross-secton. As fiber 24 is drawn, the cross-sectional area thereof can be decreased until the desired fiber dimensions are obtained. In accordance with well known techniques, the final reduction in fiber diameter can be achieved in one or more redraw steps.

Working in the aforementioned drawing viscosity range, significant out-diffusion of fluorine can take place in a matter of minutes. Since the uncollapsed tube can be in the hot zone of the drawing furnace for a period of time on the order of minutes, the tube can be subjected to a single heat treatment to simultaneously out-diffuse fluorine from the inner and outer tube surfaces and permit the tube to be drawn into a fiber.

Once the inner surface collapses, the glass is elongating at such a rapid rate that the temperature remains above the annealing point for only a matter of seconds. This is an insufficient amount of time to cause the fluorine gradient to level out by further diffusion, a process which, if permitted to occur, would destroy the waveguide.

Figure 8:
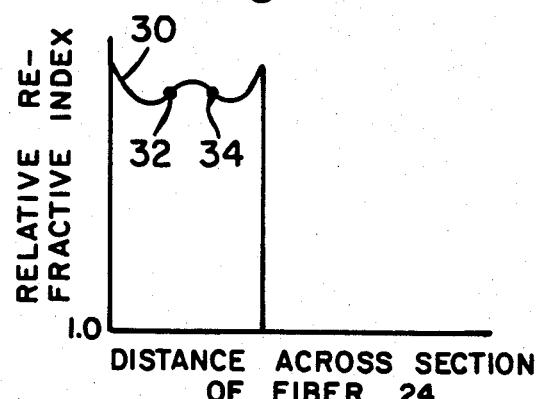
FIG. 8 illustrates the refractive index distribution across an optical waveguide fiber formed in accordance with the present invention.

FIG. 8 illustates the relative refractive index of fiber 24 across a section perpendicular to the axis of the fiber and along a diameter thereof. Points 32 and 34 on refractive index curve 30 represent the effective boundary between the core and cladding of waveguide fiber 24. Since tube 20 is subjected to a high temperature during the drawing thereof, additional fluorine diffusion will take place after the inner surface 22 collapses, thereby rounding off the central portion of curve 30.

Although the present invention has been described with respect to specific details of certain embodiments thereof, it is not intended that such details be limitations upon the scope of the invention except insofar as set forth in the following claims. It is obvious that the fluorine out-diffusion process, which has been specifically described herein in connection with the formation of optical waveguides, can also be employed to form other optical devices having layers of high refractive index.

We claim:

1. An optical waveguide comprising an elongated fluorine containing silicate glass fiber, the concentration of fluorine in said fiber gradually increasing from a first level at the optical axis of said fiber to a second level that is higher than said first level at some radius within said fiber so that the refractive index distribution throughout the length of said fiber, in a plane perpendicular to the fiber optical axis, progressively decreases from a first value at the optical axis of said fiber to a second value that is lower than said first value at some radius within said fiber, and wherein the concentration of fluorine in said fiber gradually decreases from said second level to a level lower than said second level at the outside surface of said fiber so that the refractive index distribution throughout the length of said fiber, in a plane perpendicular to the fiber optical axis, progressively increases from said second value of refractive index to a value of refractive index higher than said second value at the outer surface of said fiber.

* * * * *